United States Patent
Burtscher et al.

(10) Patent No.: US 7,730,263 B2
(45) Date of Patent: Jun. 1, 2010

(54) FUTURE EXECUTION PREFETCHING TECHNIQUE AND ARCHITECTURE

(75) Inventors: Martin Burtscher, Ithaca, NY (US); Ilya Ganusov, Ivanovo (RU)

(73) Assignee: Cornell Research Foundation, Inc., Ithaca, NY (US)

( * ) Notice: Subject to any disclaimer, the term of this patent is extended or adjusted under 35 U.S.C. 154(b) by 1138 days.

(21) Appl. No.: 11/335,829

(22) Filed: Jan. 20, 2006

(65) Prior Publication Data

US 2007/0174555 A1 Jul. 26, 2007

(51) Int. Cl.
G06F 12/00 (2006.01)
G06F 13/00 (2006.01)
G06F 13/28 (2006.01)

(52) U.S. Cl. .................................... 711/137
(58) Field of Classification Search ............... 711/137
See application file for complete search history.

(56) References Cited

U.S. PATENT DOCUMENTS

| | | | |
|---|---|---|---|
| 5,421,022 A * | 5/1995 | McKeen et al. | 712/23 |
| 5,900,022 A * | 5/1999 | Kranich | 711/205 |
| 6,574,725 B1 * | 6/2003 | Kranich et al. | 712/31 |
| 6,658,559 B1 * | 12/2003 | Arora et al. | 712/245 |
| 6,684,398 B2 * | 1/2004 | Chaudhry et al. | 718/106 |
| 6,907,520 B2 * | 6/2005 | Parady | 712/228 |
| 7,120,762 B2 * | 10/2006 | Rajwar et al. | 711/150 |
| 2004/0154011 A1 * | 8/2004 | Wang et al. | 717/158 |
| 2005/0055516 A1 * | 3/2005 | Menon et al. | 711/158 |
| 2006/0174059 A1 * | 8/2006 | Granston et al. | 711/110 |

OTHER PUBLICATIONS

J.D. Collins, D.M. Tullsen, H. Wang and J.P. Shen, "Dynamic Speculative Precomputation," Proceedings of the 34th annual ACM/IEEE International Symposium on Microarchitecture, pp. 306-317, 2001.
J. Dundas and T. Mudge, "Improving Data Cache Performance by Pre-Executing Instructions Under A Cache Miss," Proceedings of the 11th International Conference on Supercomputing, pp. 68-75, 1997.
Y. Sazeides and James E. Smith, "The Predictability of Data Values," Proceedings of the 30th annual ACM/IEEE International Symposium on Microarchitecture, pp. 248-258, 1997.

(Continued)

*Primary Examiner*—Sheng-Jen Tsai
(74) *Attorney, Agent, or Firm*—Jones, Tullar & Cooper P.C.

(57) ABSTRACT

A prefetching technique referred to as future execution (FE) dynamically creates a prefetching thread for each active thread in a processor by simply sending a copy of all committed, register-writing instructions in a primary thread to an otherwise idle processor. On the way to the second processor, a value predictor replaces each predictable instruction with a load immediate instruction, where the immediate is the predicted result that the instruction is likely to produce during its $n^{th}$ next dynamic execution. Executing this modified instruction stream (i.e., the prefetching thread) in another processor allows computation of the future results of the instructions that are not directly predictable. This causes the issuance of prefetches into the shared memory hierarchy, thereby reducing the primary thread's memory access time and speeding up the primary thread's execution.

20 Claims, 3 Drawing Sheets

OTHER PUBLICATIONS

Chi-Keung Luk, "Tolerating Memory Lataency Through Software-Controlled Pre-Execution in Simultaneous Multithreading Processors," Proceeding of the 28th annual International Symposium on Computer Architecture, pp. 40-51, 2001.

A. Moshovos, D.N. Pnevmatikatos and A. Baniasadi, "Slice-Processors: An Implementation of Operation-Based Prediction," Proceedings of the 15th International Conference on Supercomputing, pp. 321-334, 2001.

O. Mutlu, J. Stark, C. Wilkerson and Y.N. Patt, "Runahead Execution: An Alternative to Very Large Instruction Windows for Out-of-Order Processors," Proceedings of the Ninth International Symposium on High-Performance Computer Architecture, pp. 129-140, 2003.

Z. Purser, K. Sundaramoorthy and E. Rotenberg, "A Study of Slipstream Processors," Proceedings of the 33rd annual ACM/IEEE International Symposium on Microarchitecture, pp. 269-280, 2000.

A. Roth, A. Moshovos and G. Sohi, "Dependence Based Prefetching for Linked Data Structures," Proceedings of the Eighth International Conference on Architectural Support for Programming Languages and Operating Systems, pp. 115-126, 1998.

H. Zhou, "Dual-Core Execution: Building a Highly Scalbable Single-Thread Instruction Window," Proceedings of the 14th International Conference on Parallel Architectures and Compilation Techniques, 12 pages, 2005.

H. Zhou and T.M. Conte, "Enhancing Memory Level Parallelism Via Recovery-Free Value Prediction," Proceedings of the 17th annual International Conference on Supercomputing, pp. 325-335, 2003.

C. Zilles and G. Sohi, "Execution-Based Prediction Using Speculative Slices," Proceedings of the 28th annual International Symposium on Computer Architecture, pp. 2-13, 2001.

* cited by examiner

FUTURE EXECUTION PREFETCHING TECHNIQUE AND ARCHITECTURE

GOVERNMENT SPONSORSHIP STATEMENT

This invention was made with Government support from the National Science Foundation (NSF) under grant numbers CNS-0125987 and CCF-0312966. The Government has certain rights in the invention.

BACKGROUND OF THE INVENTION

1. Field of the Invention

The present invention relates in general to a prefetching technique referred to as future execution (FE) and associated architecture for accelerating execution of program threads running on microprocessors, particularly those of the multi-core variety. Important data for each program thread is prefetched through concurrent execution of a modified version of the same thread, preferably using an available idle processor core that operates independently of the active core on which the original program thread is being executed.

2. Description of the Background Art

The cores of modern high-end microprocessors deliver only a fraction of their theoretical peak performance. One of the main reasons for this inefficiency is the long latency of memory accesses during execution of a program thread. As the processor core executes instructions, the data required by the instructions must be accessed from memory, which is a time consuming process. To speed up this process, smaller, fast access memory caches that may be resident on the processor chip itself are employed where the data required by the program thread can be prestored. Among other instructions, program threads include load instructions, which specify that data at a certain location in memory be loaded into a register. Often, these load instructions stall the CPU, especially during cache misses, because the data takes so long to arrive that the processor runs out of independent instructions to execute. As a consequence, the number of instructions executed per unit time is much lower than what the CPU is capable of handling.

Prefetching techniques have been instrumental in addressing this problem. Prefetchers attempt to guess what data the program will need in the future and fetch them in advance of the actual program references. Correct prefetches can thus reduce the negative effects of long memory latencies. While existing prediction-based prefetching methods have proven effective for regular applications, prefetching techniques developed for irregular codes typically require complicated hardware that limits the practicality of such schemes.

Hardware prefetching techniques based on outcome prediction typically use various kinds of value predictors and/or pattern predictors to dynamically predict which memory references should be prefetched. The advantage of prefetching schemes based on outcome prediction is the ability to implement the schemes in the cache controller so that other parts of the microprocessor do not need to be modified. This way the implementation of the prefetching scheme can be decoupled from the design of the execution core, significantly lowering the complexity and the verification cost. The downside of such prefetching schemes is their limited coverage and ability to capture misses that exhibit irregular behavior.

Execution-based prefetching techniques typically use additional execution pipelines or idle thread contexts in a multithreaded processor to execute helper threads that perform dynamic prefetching for the main thread. Helper threads can be constructed dynamically by specialized hardware structures or statically. If a static approach is used, the prefetching threads are constructed manually or are generated by the compiler.

Static software helper threads (SHTs) and other (compiler) optimizations only accelerate newly compiled programs but not legacy code and may bloat the code size and thus decrease the instruction-cache efficiency. They may also require ISA or executable format changes, the extra instructions to set up and launch the helper threads may compete for resources with the main thread, and the overhead (e.g., copying of context) associated with the often frequent starting and stopping of SHTs may be significant.

If helper threads are constructed dynamically, a specialized hardware analyzer extracts execution slices from the dynamic instruction stream at run-time, identifies trigger instructions to spawn the helper threads and stores the extracted threads in a special table. Examples of this approach include slice-processors and dynamic speculative precomputation.

Many thread-based software and hardware techniques propose to use the register results produced by the speculative helper threads. Examples include the multiscalar architecture, threaded multiple path execution, thread-level data speculation, speculative data-driven multithreading, and slipstream processors. Even though the idea to reuse already computed results sounds appealing, it introduces additional hardware complexity and increases the design and verification cost.

Runahead execution is another form of prefetching based on speculative execution. In runahead processors, the processor state is checkpointed when a long-latency load stalls the processor, the load is allowed to retire and the processor continues to execute speculatively. When the data is finally received from memory, the processor rolls back and restarts execution from the load.

Another technique for dealing with memory latency issues is to use multiple processor cores. All major high-performance microprocessor manufacturers have announced or are already selling chips that employ a performance increasing technology called Chip Multiprocessing (CMP) in which the entire processor core with almost all of its subsystems is duplicated or multiplied. Typically, a CMP processor contains two to eight cores. Future generations of these processors will undoubtedly include more cores. The minimal dual-core speculative multi-threading architecture (SpMT) and the dual-core execution paradigm (DCE) utilize idle cores of a CMP to speed up single-threaded programs. SpMT and DCE attempt to spawn speculative threads on the idle cores by copying the architectural state to the speculative cores and starting execution from a certain speculation point in the original program. Speculative threads prefetch important data and thus speed up the execution of a non-speculative thread. These techniques need mechanisms to control the execution of the speculative threads by checking the speculative results and/or tracking the violation of memory dependences. In addition, both SpMT and DCE require non-speculative core to change the operation mode upon reaching the speculation point.

SUMMARY OF THE INVENTION

The present invention provides a prefetching technique for improving memory access speeds during execution of a program thread by a processor core, which combines value prediction with separate execution, preferably by a second processor core, of a modified version of the original program thread. This technique inherently results in caching of data that is to be used by the original program thread at a future time. The technique, referred to as future execution (FE), is based on the observation that most cache misses are caused by repeatedly executed loads with a relatively small number of dynamic instructions between consecutive executions of these loads. Moreover, the sequence of executed instructions leading up to the loads tends to remain similar. Hence, for each executed load, there is a high probability that the same load will be executed again soon.

To exploit this property, FE dynamically creates and executes a prefetching thread for each active thread by simply creating a copy of all committed, register-writing instructions in the active thread and using a value predictor to replace each predictable instruction in the prefetching thread with a load immediate instruction, where the immediate is the predicted result that the instruction is likely to produce during its $n^{th}$ next dynamic execution. Executing this modified instruction stream (i.e., the prefetching thread) allows the processor to compute the future results of the instructions that are not directly predictable, issue prefetches into the shared memory hierarchy, and thus reduces the primary thread's memory access time.

Preferably, the prefetching thread is executed by a second, idle processor core that shares only the cache with the first, active processor core. As the prefetching thread is executed by the second core, the data that is required for execution of the original program thread will be fetched from memory and loaded into the shared cache. As a result the first active core can execute the original program thread more quickly. In addition, there is no need for bidirectional communication between the two processor cores. The only modifications necessary to a conventional RISC architecture are the provision of a conventional value predictor for replacing instructions in the original thread with their results where the results are determined to be predictable within a certain confidence level and a one way communication link between the commit stage of the first core and the value predictor for supplying the program instructions and results from the original thread thereto. This communication link then feeds the modified instruction stream from the value predictor to the second core for execution.

The value predictor is used to determine the likely result each instruction is going to produce in the $n^{th}$ next iteration, including the addresses of load instructions. However, many important load addresses are not directly predictable. Fortunately, even if a missing load's address exhibits no regularity and is thus unpredictable, it is often possible to correctly predict the input values to its dataflow graph (backward slice) and thus to compute a prediction for the address in question. Since the same sequence of instructions tends to be executed before each critical load, the dataflow graph stays largely the same. Exploiting this property, future execution predicts all predictable values in the program and then speculatively computes all values that are reachable from the predictable ones in the program's dataflow graph, which greatly increases the number of instructions for which an accurate prediction is available.

The use of a second idle core in a CMP to perform the future execution is preferred because it frees up the first core, simplifies implementation of the technique and allows the idle execution resources of the second core to be put to good use. In the preferred embodiment, whenever additional threads need to be run on the CMP, the prefetching activity is canceled so that the second core can be utilized by another thread for non-speculative computation. In this manner, future execution provides a way for multi-core processors to provide immediate benefits and presents a relatively simple yet effective architectural enhancement to exploit additional cores to speed up individual threads without the need for any programmer intervention or compiler support.

In the preferred embodiment of the present invention, the FE mechanism works as follows. The original unmodified program executes on the first core. As each register-writing instruction commits, it is fed to and updates the value predictor with its current result. Then the value predictor makes a prediction to obtain the likely value the register-writing instruction is going to produce during its $n^{th}$ next execution. If the confidence of the prediction is high, the instruction is replaced with a load immediate instruction, where the immediate is the predicted result. Instructions with a low prediction confidence remain unmodified. In this manner, the value predictor generates a new set of instructions that can be referred to as a prefetching thread.

Next, the processed stream of instructions that make up the prefetching thread is sent to the second core, where it is injected into the dispatch stage of the pipeline. Instructions are injected in the commit order of the first core to preserve the program semantics. Since it is assumed that the same sequence of instructions will execute again in the future, the second core essentially executes n iterations ahead of the non-speculative program running in the first core. The execution of each instruction in the second core proceeds normally utilizing the future values. Loads are issued into the memory hierarchy using speculative addresses and instructions commit ignoring all exceptions.

In simulations designed to test the effectiveness of future execution, it was found that future execution by itself does indeed speed up the rate of execution of most program threads substantially. In addition, it was discovered that a synergistic benefit could be realized by combining future execution with two other known prefetching techniques, runahead execution and stream prefetching. In fact, in some cases, it was discovered that the speed increase obtained when the techniques were combined with future execution was greater that the sum of the speedups obtained from using each of the prefetching techniques individually.

Future execution has a number of differences and advantages when compared to other prefetching approaches. Unlike previous approaches, future execution employs value prediction only to provide initial predictions. These initial predictions are then used to compute all values reachable from the predictable nodes in the program dataflow graph, i.e., to obtain predictions for otherwise unpredictable values. This approach significantly improves the prediction coverage relative to conventional value prediction. Since future execution requires relatively simple modifications to the execution core of the microprocessor, it provides a reasonable tradeoff between the implementation cost and the resulting performance improvement.

Unlike SHTs, FE allows one to dynamically change the prefetching distance through a simple adjustment in the predictor and can cancel the prefetching activity if no resources are available. Since a SHT is only able to execute once all inputs to the thread are available, it runs a higher risk of prefetching late. FE, on the other hand, does not need all inputs to initiate prefetching. Finally, if any load with dependent instructions in a SHT misses in the cache, the prefetching thread will stall, preventing further prefetching. FE breaks dataflow dependencies through value prediction and thus can avoid stalling the prefetch activity. Notwithstanding, the approach may well be complementary to software-controlled helper threads.

Even though future execution is also a hardware mechanism, it needs very little specialized hardware to create the prefetching thread, it does not require any storage for prefetching threads, and it works without any thread triggers. The only storage structure necessary is the prediction table, which is modest in complexity and size and can, in fact, be shared with other performance-enhancing mechanisms such as predictor-directed stream buffers or checkpointed early load retirement.

Future execution does not need to experience a cache miss to start prefetching and requires no checkpointing support or any other recovery mechanism. Unlike the minimal dual-core speculative multi-threading architecture (SpMT) and the dual-core execution paradigm (DCE), FE generates prefetching threads that are completely decoupled from the non-speculative execution, which eliminates the need for any checking mechanism and makes it recovery-free. In addition, both SpMT and DCE require non-speculative cores to change the operation mode upon reaching the speculation point, while in FE, the non-speculative computation core is not even aware that prefetching is taking place. In other words, the results produced by future execution are used solely for prefetching, which eliminates the need for any mechanism to integrate the results in the original thread.

While multiple cores are beneficial in multiprogrammed environments, the performance of individual computation threads does not improve and may even suffer a penalty because of increased contention for shared memory hierarchy resources. In many cases a programmer might have to manually parallelize applications in order to get a benefit from multiple cores, which increases the software complexity and cost. In light of this trend, architectural techniques that smooth the transition from single to multi-core computing are becoming very important. The subject future execution technique provides a way for multi-core processors to provide immediate benefits and presents a relatively simple yet effective architectural enhancement to exploit additional cores to speed up individual threads without the need for any programmer intervention or compiler support.

Future execution thus offers the following advantages and novelties. First, it presents a new approach to creating prefetching threads in a cheap and efficient manner without complicated instruction stream analyzers, identification of thread spawn points or trigger instructions, or storage for prefetching treads. Second, FE provides a simple technique to compute accurate predictions for instructions producing irregular sequences of addresses (or results) that are not directly predictable. Third, future execution requires no changes to the instruction set architecture (ISA) and needs no programmer or compiler support. As such, it can speed up legacy code as well as new code. Fourth, the critical path in any of the cores is unlikely to be affected by the FE technique, and no hardware is needed to integrate pre-execution results into the main program. Fifth, future execution is recovery-free and the results generated by the prefetching thread do not need to be verified for correctness. As a consequence, the prefetching thread never has to be killed and restarted. Sixth, the technique allows the prefetching distance n to be adaptively changed through a simple adjustment in the predictor. Seventh, FE has a low thread startup cost (no hardware context needs to be copied) and can instantly stop or resume the execution of the prefetching thread depending on the availability of an idle core. Finally, FE is believed to be relatively power, energy and temperature efficient as parts of the second core are unused and can be turned off, only a fraction of all instructions are sent to the second core, roughly half of those instructions are simple load immediates, and many data dependencies and all control dependencies have been removed. This suggests that the future execution core can be operated at a lower voltage and/or frequency, thus further minimizing its power consumption.

BRIEF DESCRIPTION OF THE DRAWINGS

The foregoing and other features and advantages of the present invention will become apparent from the following detailed description of a preferred embodiment thereof, taken in conjunction with the accompanying drawings, in which.

DETAILED DESCRIPTION OF THE PREFERRED EMBODIMENT

A detailed discussion of the implementation of the FE micro-architecture will be presented following a discussion of the quantitative analysis of the observations that inspired the present invention. One of the main program properties exploited by FE is that most load misses occur in "loops" with relatively short iterations. Note that any repetitively executed instruction is referred to as a "loop" instruction. The distance between the load instructions that cause an L2 cache miss and the previous execution of the same load instruction were evaluated. It was found from the quantitative analysis that on average from 70 to 80% of the misses occur in loops with iterations shorter than 1000 instructions. This observation suggests a prefetching approach in which each load instruction triggers a prefetch of the address that the same load is going to reference in the $n^{th}$ next iteration. Since in most cases the time between the execution of a load instruction and its next dynamic execution is relatively short, such an approach provides a low risk of prefetching much too early.

Analyzing the instructions in the dataflow graphs of the problem loads, it was discovered that while problem load addresses might be hard to predict, the inputs to their dataflow graphs often are not. Therefore, even when the miss address itself is unpredictable, it is frequently possible to predict the input values of the instructions leading up to the problem loads and thus to compute an accurate prediction by executing these instructions.

While value prediction alone is quite effective for some applications, future execution can significantly improve the fraction of load miss addresses that can be correctly predicted and prefetched. In experiments on the FE technique, half of the programs used in the experiments experienced a significant (over 10%) increase in prediction coverage when future execution is employed in addition to value prediction.

Figure 1:
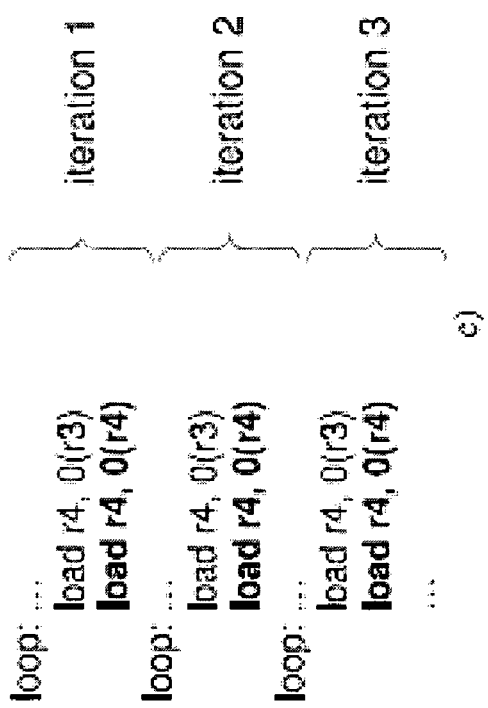
FIG. 1 is an example of program code in which data to be used during execution of the code that cannot otherwise be predicted by a conventional prediction technique, can be predicted and prefetched from memory using the future execution technique of the present invention.

FIG. 1 shows a code example in a) that exhibits the program properties discussed above. This code was extracted from one of many tested programs and simplified. An array of pointers A is traversed, each pointer is dereferenced and the resulting data are passed to the function "foo." Assume that the data referenced by the elements of array A are not cache-resident. Further assume that there is little or no regularity in the values of the pointers stored in A. Under these assumptions each execution of the statement data=*ptr will cause a cache miss. As shown in b) of FIG. 1, in machine code this statement translates into a single load instruction load r4, 0(r4) (highlighted in FIG. 1 in bold).

A conventional predictor will not be able to predict the address of the problem instruction since there is no regularity in the address stream for this instruction. However, the address references of instruction load r4, 0(r3) are regular because each instance of this instruction loads the next consecutive element of array A. Therefore, it is possible to use a value predictor to predict the memory addresses for this instruction, speculatively execute it, and then use the speculatively loaded value to prefetch the data for the problem load instruction. Since the control flow leading to the computation of the addresses of the problem load remains the same throughout each loop iteration (part c) of FIG. 1), a value predictor can provide predictions for the next iterations of the loop and the addresses of the problem load will be computed correctly. Therefore, sending the two load instructions to the second core in commit order and future predicting the first instruction makes it possible to compute the addresses of the second load that will be referenced by the main program during the next iterations.

Figure 2:
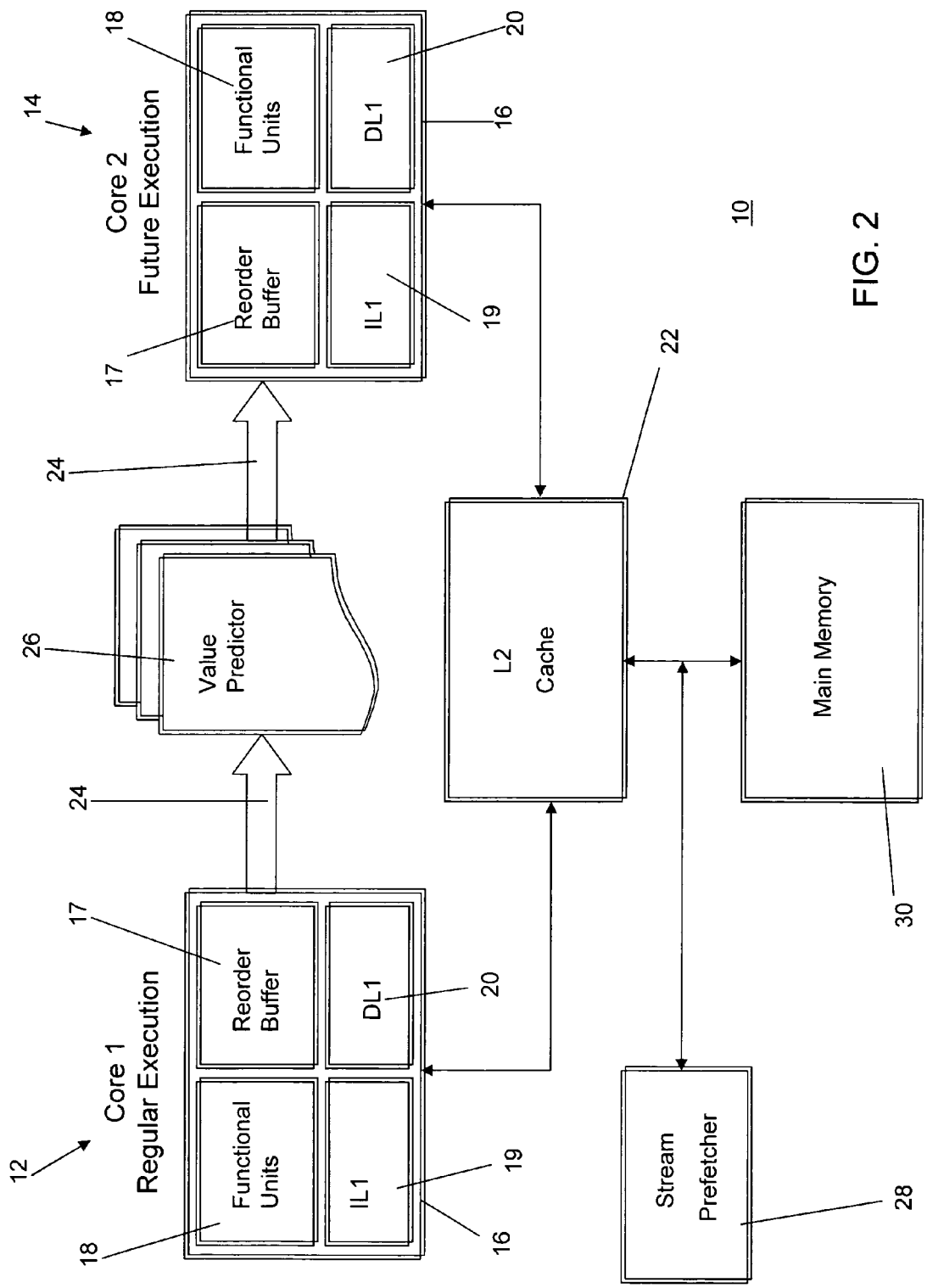
FIG. 2 is a block diagram illustrating a processor architecture that is designed to implement the future execution technique of the present invention in accordance with a preferred embodiment thereof.

The preferred implementation of future execution is based on a conventional chip multiprocessor (CMP). A high-level block diagram of a two-way CMP 10 supporting FE is shown in FIG. 2. The CMP 10 includes two processor cores 12 and 14. It should be understood that although the use of two processor cores on a CMP is preferred, it is envisioned that the invention could also be carried out using first and second processor contexts of a multithreaded single processor core, though the resulting performance would likely not be as good as that of the two core embodiment. Still further, a single threaded processor core could be used to carry out the invention, though the performance would likely suffer even more with such an arrangement.

Each of the processor cores 12 and 14 includes a superscalar execution engine 16. As is conventional, each superscalar engine 16 includes a reorder buffer 17, a plurality of functional units 18 and private L1 instruction and data caches 19 and 20, respectively. An L2 cache 22 is shared between the two cores 12 and 14. Conventional program execution is performed on the regular core 12 while future execution is performed on the second core 14. To support FE, a unidirectional communication link 24 is disposed between the cores 12 and 14, with a value predictor 26 attached thereto. Both the communication link 24 and the value predictor 26 are not on the critical path and should not affect the performance of either core 12 or 14 in a negative way.

The value predictor 26 can be any known value predictor module. As an example, in the experiments conducted to verify the operation of the invention, a relatively simple, PC-indexed stride-two-delta predictor with 4,096 entries was employed. The predictor 26 estimates the confidence of each prediction it makes using 2-bit saturating up-down counters. The confidence is incremented by one if the predicted value was correct and decremented by one if the predicted value was wrong. The particular organization of the value predictor (and the confidence estimator) is not essential to the FE process and a more powerful predictor (e.g., a DFCM predictor) and confidence estimator may lead to higher performance.

In the preferred embodiment, a hardware stream prefetcher 28 is disposed between the shared L2 cache 22 and a main memory 30. This known prefetching device operates independently of the FE mechanism but has been shown to provide a synergistic benefit when combined with FE. The stream prefetcher 28 tracks the history of the miss addresses and detects patterns that can be employed to predict addresses for future data. For example, if the stream prefetched 28 determines that the cache misses are occurring for data that resides at addresses that are evenly spaced (have the same stride), then the stream prefetcher 28 can use that information to access data from the main memory 30 and place it into the L2 cache 22 before the data is required by the processor executing the thread.

Figure 3:
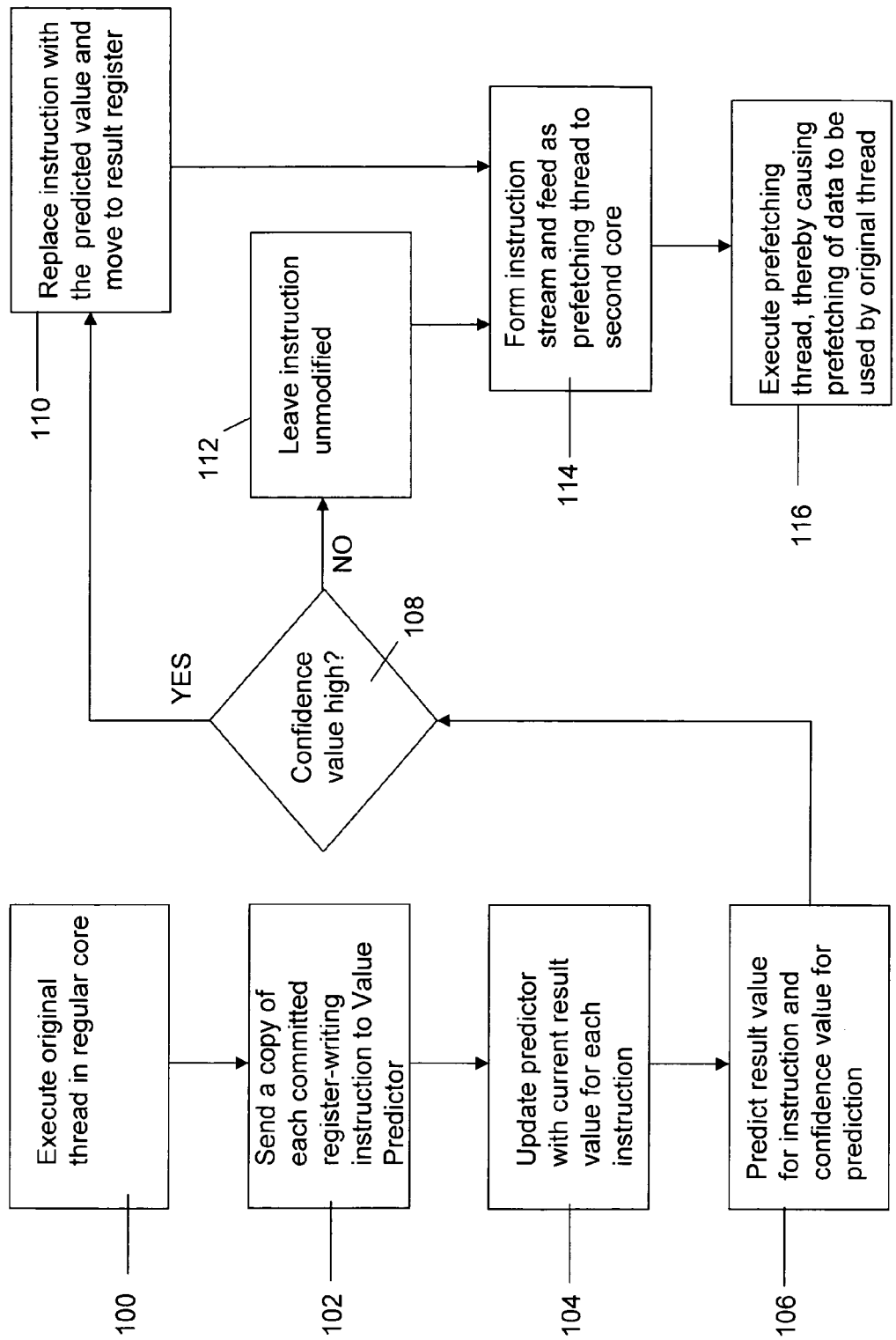
FIG. 3 is a flowchart illustrating the process flow for forming and executing a future execution prefetching thread in accordance with the preferred embodiment.

The operation of the CMP 10 using the future execution technique in accordance with the preferred embodiment of the invention is illustrated in the flow chart of FIG. 3. First, at step 100, the original program thread is executed by the regular core 12. Then, at step 102, each register-writing instruction committed in the regular core 12 and its resultant data are sent to the value predictor 26 via the communication link 24 for preprocessing in advance of being executed by the second core 14. The data that need to be transferred to the second core 14 include the decoded instruction, result value and a partial PC to index the value predictor table. Stores, branches, jumps, calls, returns, privileged instructions and system calls are not transmitted. If the buffer for the communication link 24 is full, further committed instructions are dropped and not transmitted to the second core 14.

As each instruction and its output or result pass through the value predictor 26, the information in the value predictor 26 is updated at step 104 with the current output or result of the instruction. At step 106, the value predictor 26 then predicts the value that the instruction is likely to produce in the $n^{th}$ next iteration. Each prediction is accompanied by a confidence estimation.

Next, at step 108, the confidence estimation is evaluated. If the confidence of the prediction is high (e.g., 50% or greater, though it will be understood that the threshold can be selected to be any desired value), the corresponding instruction is replaced by a load immediate instruction, where the immediate is the predicted result (step 110). If the predicted instruction is a memory load, an additional non-binding prefetch instruction for that load's address is generated right before the load immediate instruction. This allows the future core to prefetch this data without stalling the pipeline if the memory access misses in the cache. All instructions with a low prediction confidence below the selected threshold value remain unmodified (step 112).

After that, at step 114, the processed stream of committed instructions, which forms the prefetching thread for execution by the second core 14, is sent to the second core 14, where it is injected into the dispatch stage of the pipeline. Since instructions are transmitted in decoded format, they can bypass the fetch and decode stages. Instruction dispatch proceeds as normal—each instruction is renamed and allocated a reservation station and a ROB entry if these resources are available. Finally, at step 116, the prefetching thread is executed by the second core 14, the process of which inherently causes data to be loaded into the L2 cache 22 that will be required during execution of the original program thread by the first core 12. Whenever the input values for the instruction are ready, it executes, propagates the produced result to the dependent instructions and updates the register file. If the instruction at the head of the ROB is a long latency load, it is forced to retire after a timeout period that equals the latency of an L2 cache hit. This approach significantly improves the performance of the FE mechanism as it avoids stalling the pipeline. Timed out instructions set the invalid bit in the corresponding result register. The execution of instructions that depend on the invalidated register is suppressed.

When entering FE mode, i.e., before the prefetching thread starts being injected into the available idle core 14, all registers of that core are invalidated. This flash invalidation of all registers occurs only once before the future execution thread is launched. The invalid register bits are gradually reset by the executed future instructions that have valid inputs. For example, load immediate instructions always make their target registers valid since they do not have input dependencies.

Future execution requires additional hardware support to transmit decoded instructions, their result values, and partial PCs to the value predictor 26 between the cores 12 and 14. Depending on the microarchitecture, the ROB 17 of the regular core 12 may have to be augmented to hold the necessary data until instruction retirement. In the study carried out to validate the invention, the communication bandwidth corresponded to the commit width (4 instructions/cycle), which is believed to be a reasonable bandwidth for a unidirectional on-chip point-to-point link. Since it is rare for a microprocessor to fully utilize its commit bandwidth for a long period of time and since not all instructions need to be transmitted to the second core, it may be possible to curtail the bandwidth without loss of performance.

The register file of the future core 14 may have to be extended to accommodate an invalid bit for each physical register. Only one extra bit per register is needed. Many modern microprocessors already include some form of dirty or invalid bits associated with each register that could be utilized by the FE mechanism.

Since the preferred embodiment employs a CMP with private L1 caches 20, a mechanism is needed to keep the data in the private L1 caches 20 of the two cores 12 and 14 consistent. In the experimental setup, an invalidation-based cache coherency protocol was employed for this purpose. Therefore, whenever the main program executed a store instruction, the corresponding cache block in the private cache of the future core 14 was invalidated. Since store instructions are not sent to the future core 14, future execution never incurs any invalidations.

To evaluate the effectiveness of future execution, programs were run on simulator software emulating a two-way CMP consisting of two identical four-wide dynamic superscalar cores. In all modeled configurations, it was assumed that one of the cores in the CMP can be used for future execution. A configuration with an aggressive hardware stream prefetcher between the shared L2 cache and main memory was also simulated. The stream prefetcher tracks the history of the last 16 miss addresses, detects arbitrary-sized strides, and applies a stream filtering technique by only allocating a stream after a particular stride has been observed twice. It can simultaneously track 16 independent streams, and prefetch up to 8 strides ahead of the data consumption of the processor. The tested implementation of the future execution mechanism employed a stride-two-delta (ST2D) value predictor that predicts values four iterations ahead. Predicting four iterations ahead does not require extra time in case of the ST2D predictor. The predictor hardware was simply modified to add the predicted stride four times, which is achieved by a rewiring that shifts the predicted stride by two bits.

Experiments were conducted to measure the effectiveness of FE, both with and without other prefetching techniques, including stream prefetching and runahead execution. The results of the experiments confirmed that future execution not only improves execution speeds of most tested programs, but also complements stream prefetching and runahead execution by prefetching different classes of load misses. When stream prefetching is combined with future execution, the two techniques demonstrate significant synergy. In a number of tested programs, the coverage was found to be at least 10% higher than when either technique is used alone.

Preferably, the future execution technique is also combined with another recently proposed execution-based prefetching technique known as runahead execution. When combined, the two techniques have also shown in simulations to provide synergistic results. In the runahead technique, as the first processor core 12 executes a program thread, all memory operations that miss in the L2 cache are nullified and retired if they remain unresolved at the time they reach the ROB head. This technique starts by the processor core 12 taking a checkpoint of the architectural state and retiring the missing load before the processor enters runahead mode. In runahead mode instructions execute normally except for two major differences. First, the instructions that depend on the result of the load that was "nullified" do not execute but are nullified as well. They commit an invalid result and retire as soon as they reach the head of the ROB. Second, store instructions executed in runahead mode do not overwrite data in memory. When the original nullified memory operation completes, the processor rolls back to the checkpoint and resumes normal execution. All register values produced in runahead mode are discarded. The advantage of using runahead execution is that it enables precaching of data that will be required once the processor resumes normal execution.

In simulations using runahead execution, runahead mode was triggered by load instructions that stall for more than 30 cycles. Store data produced in runahead mode is retained in a runahead cache, which is flushed upon the exit from runahead mode. In addition to the conventional version of runahead execution, two extensions of the technique were also implemented and evaluated. First, value prediction was employed to supply load values for the long-latency load instructions. When such loads time-out, a stride-two-delta value predictor provided a predicted load value and a prediction confidence. If the confidence was above a threshold, the predicted value was allowed to propagate to dependent instructions. If the confidence was below the threshold, the result of the load instruction that timed out was invalidated in the same way loads are invalidated in the conventional runahead mechanism.

Second, a checkpointed early load retirement mechanism (CLEAR) was implemented, which attempts to avoid squashing the correct program results produced in runahead mode. The CLEAR mechanism utilizes value prediction to provide values for the load instructions that time out. While the conventional runahead mechanism checkpoints the processor state only once before entering runahead mode, CLEAR checkpoints the processor state before every prediction that is made in runahead mode. If the value provided by the value predictor was incorrect, the processor state is rolled back to the checkpoint corresponding to that value prediction. However, if the prediction was correct, the corresponding checkpoint is released and the processor does not have to roll back after the long-latency memory operation completes.

Note that both runahead extensions that were evaluated shared value prediction and confidence estimation tables with the future execution mechanism. When runahead was used without future execution, only load instructions updated the value predictor. When runahead and future execution were used together, every committed instruction updated the value predictor with the exception of stores, branches and system calls. The implementation of CLEAR assumed an unlimited number of available checkpoints.

When runahead execution and future execution were employed together, their cumulative effect was found to be quite impressive. The interaction between future execution and runahead execution resulted in speedups as much as 50% higher than when either of the techniques was used alone.

This result is actually quite impressive in view of the fact the different prefetching techniques usually overlap each other extensively when combined. Runahead allows prefetching of cache misses that are within a close temporal proximity of the long-latency load instructions that initiated the runahead mode. Therefore, even though runahead execution obtains significant prefetch coverage while the processor is in runahead mode, its potential is limited by the length of the runahead period. On the other hand, FE prefetches can generally hide more latency than runahead prefetches because the FE mechanism issues memory requests several iterations ahead of the current execution point. In spite of the better prefetch timeliness, FE's coverage is sometimes limited by the value prediction coverage and the regularity of the address-generating slices. The combination of runahead execution and future execution allows exploiting the strengths of both approaches, thus resulting in symbiotic behavior.

The effectiveness of future execution when several hardware parameters are varied was also evaluated. The parameters included memory latency, inter-core communications latencies and prefetch distances. First, the speedup provided by FE on processors with five different memory latencies, ranging from 100 to 500 cycles was evaluated. It was found that overall, the performance benefit for both integer and floating-point programs steadily increases with increasing memory latency. None of the programs exhibited a slowdown relative to the baseline processor with stream prefetching.

As the communication latency was increased from 5 to 30 cycles, most of the applications showed no significant changes in the amount of speedup obtained by future execution. FE is not very sensitive to the communication delay because of two main reasons. First, prefetching four iterations ahead hides the full memory latency for many of the applications and delaying a prefetch request by an additional 5-25 cycles still results in a timely prefetch. Second, even if the delayed prefetch does not hide the full memory latency, the communication delay constitutes only a small fraction of the total memory latency. Increasing the latency of a prefetched memory request by a few percent does not have a significant performance impact.

Next, the impact of the prefetch distance on the performance of future execution was analyzed. The prediction distance of the value predictor 26 was varied from 1 to 10 iterations ahead. The results showed that most of the programs benefit from an increased prefetch distance. As one might expect, the prefetch coverage generally decreases slightly for larger lookaheads, but the reduction in coverage is compensated for by the improved timeliness of the prefetch requests. Surprisingly, some programs exhibited a growing prefetch coverage with increasing prefetch distance. This phenomenon occurs due to a favorable interaction between future execution and the stream prefetch engine. As the prediction distance is increased, the memory requests issued by future execution indirectly increase the prefetch distance of the stream prefetcher and thus make the stream prefetches timelier. Therefore, fewer loads time out in the future core and fewer address-generating slices get invalidated, enabling more future load addresses to be computed. It was found that prefetching more than 10 strides ahead does not improve FE performance. The results suggest that future execution may greatly benefit from a dynamic mechanism to adjust the prediction distance. For example, the time between successive occurrences of the same instruction can be monitored and the prediction distance adjusted accordingly. If, for example, the desired distance between a current instruction result and a predicted future result is 200 cycles and the detected distance between occurrence of the same instruction is 50 cycles, then the value predictor should predict values for the 200/50=4 iterations ahead.

Future execution was also found to provide good prefetch timeliness. The prefetch timeliness indicates how much of the memory latency is hidden by the prefetches. In the experiments, the majority of the prefetches in the simulated programs were found to be completely timely, fully eliminating the associated memory latency. The timeliness of future execution prefetches can also be improved by adjusting the prediction distance of the future value predictor. For example, increasing the prediction distance from 4 to 8 increased the number of completely timely prefetches for most of the programs with a low prefetch timeliness by at least 15%, resulting in a significant increase in performance.

Overall, the experiments demonstrated that prefetching based on future execution is quite accurate, significantly improves the prefetching coverage over stream prefetching, and provides timely prefetches, which may be further improved by dynamically varying the prediction distance in response, for example, to the latency between executions of the same instruction. Prefetching based on future execution obtains performance improvements across microprocessor configurations with different memory latencies and inter-core communication delays.

In conclusion, (FE) represents a simple technique for hiding the latency of cache misses using moderate hardware and no ISA, programmer or compiler support. FE harnesses the power of a second core in a multi-core microprocessor to prefetch data for a thread running on a different core of the same chip. It dynamically creates a prefetching thread by sending a copy of all committed, register-writing instructions to the second core. The innovation is that on the way to the second core, a value predictor replaces each instruction's result in the prefetching thread with the result the instruction is likely to produce during its $n^{th}$ next execution. Future execution then leverages the second core's execution capabilities to compute the prefetch addresses that could not be predicted with high confidence, which was found to significantly increase the prefetching coverage. FE requires only small chip area additions. Unlike previously proposed approaches, FE is recovery-free, does not need any thread triggers, features an adjustable lookahead distance, does not use complicated analyzers to extract prefetching threads, requires no storage for prefetching threads, and works on legacy code as well as new code. Overall, FE delivers a substantial speedup over a baseline with an aggressive stream prefetcher on the simulated applications. Furthermore, future execution is complementary to runahead execution and the combination of these two techniques raises the average speedup still further.

Although the invention has been disclosed in terms of a preferred embodiment and variations thereon, it will be understood that numerous other variations and modifications could be made thereto without departing from the scope of the invention as defined in the following claims.

What is claimed is:

1. A method for prefetching data from a computer memory and placing it in a cache to be accessed by a processor during execution of a program thread comprising the steps of:

executing a sequence of instructions in a program thread using a first processor, said instructions at least including a plurality of register-writing instructions, some of which specify an address where data to be loaded into a processor register during execution of said instruction resides;

after each register-writing instruction is executed, supplying the instruction and a result thereof to a value predictor and updating the value predictor with said result;

employing the value predictor to determine a likely result for a future execution of said instruction;

if the predicted value is determined to have a confidence level exceeding a threshold, then substituting the instruction with a load immediate instruction, where said immediate is said predicted value;

forming said instructions as they are processed by said value predictor into a prefetching thread; and executing said prefetching thread with a second processor that also accesses said cache, wherein said value predictor is attached to a unidirectional communication link connecting said first processor to said second processor which supplies each said register-writing instruction and the result thereof from said first processor to said value predictor and then supplies said prefetching thread from said value predictor to said second processor for execution thereby, whereby data to be employed during execution of said program thread is caused to be loaded into said cache by execution of said prefetching thread.

2. The method of claim 1, wherein said program thread is executed by a first processor core and said prefetching thread is executed by a second processor core.

3. The method of claim 1, further comprising the steps of detecting address patterns in said original program thread wherein memory-accessing instructions that repeatedly occur in said thread each specify a memory address that bears an identifiable relationship with an address of a previously executed memory-accessing instruction and if such patterns are detected, then prefetching data from said memory based on said detected patterns and loading said data into said cache.

4. The method of claim 1, further comprising the steps of determining whether an instruction in said original program thread requires data from said memory whose access will stall said first processor; and if so, temporarily retiring said instruction but continuing to execute instructions following said retired instruction to facilitate precaching of upcoming data from said memory into said cache; and when said data for said retired instruction is finally retrieved from memory, restarting execution of said original program thread from said retired instruction.

5. The method of claim 1, further including the step of dynamically adjusting a number of iterations ahead that said value predictor predicts the result of each instruction in response to a currently detected cycle time between executions of consecutive iterations of an instruction.

6. A computer system comprising:
a first processor for executing a program thread;
at least one cache accessible by said processor to hold data to be employed during execution of said program thread;
a memory accessible by said processor;
wherein, said program thread includes a sequence of register-writing instructions at least including a plurality of memory-accessing instructions that each specify an address where data to be loaded into a register in said processor during execution of said memory-accessing instruction resides in said memory;
a value predictor for receiving from said first processor, said register-writing instructions and results thereof, determining a likely result for a future execution of each said instruction and forming a prefetching thread comprised of said results generated by said value predictor if said value is determined to have a confidence level exceeding a threshold; and
a second processor for executing said prefetching thread, said second processor also accessing said cache, wherein said value predictor is attached to a unidirectional communication link connecting said first processor to said second processor which supplies each said register-writing instruction and the result thereof from said first processor to said value predictor and then supplies said prefetching thread from said value predictor to said second processor for execution thereby;
whereby execution of said prefetching thread causes data to be employed during execution of said first program thread to be loaded into said cache.

7. The system of claim 6, wherein said first and second processors comprise first and second processor cores.

8. The system of claim 6, further comprising a stream prefetching module for detecting address patterns in said original program thread for memory-accessing instructions that specify addresses which are not resident in said cache, occur repeatedly in said thread and bear an identifiable relationship with an address of a previously executed memory-accessing instruction and if such patterns are detected, then prefetching data from said memory based on said detected patterns and loading said data into said cache.

9. The system of claim 6, wherein said first processor includes means for performing runahead execution wherein if an instruction in said original program thread requires data from memory whose access will stall said first processor; temporarily retiring said instruction but continuing to execute instructions following said retired instruction to facilitate precaching of upcoming data from said memory into said cache; and when said data for said retired instruction is finally retrieved from memory, restarting execution of said original program thread from said retired instruction.

10. The system of claim 6, wherein said value predictor includes means for dynamically adjusting a number of iterations ahead that said value predictor predicts the result of each instruction in response to a currently detected cycle time between executions of consecutive iterations of an instruction.

11. A method for prefetching data from a computer memory and placing it in a cache to be accessed by a processor during execution of a program thread comprising the steps of:

executing a sequence of instructions in a program thread using a first processor, said instructions at least including a plurality of register-writing instructions, some of which specify an address where data to be loaded into a processor register during execution of said instruction resides;

after each register-writing instruction is executed, supplying the instruction and a result thereof to a value predictor and updating the value predictor with said result;

employing the value predictor to determine a likely result for a future execution of said instruction, said step further including dynamically adjusting a number of iterations ahead that said value predictor predicts the result of each instruction in response to a currently detected cycle time between executions of consecutive iterations of an instruction;

if the predicted value is determined to have a confidence level exceeding a threshold, then substituting the instruction with a load immediate instruction, where said immediate is said predicted value;

forming said instructions as they are processed by said value predictor into a prefetching thread; and executing said prefetching thread, whereby data to be employed during execution of said program thread is caused to be loaded into said cache by execution of said prefetching thread.

12. The method of claim 11, wherein said prefetching thread is executed by a second processor that also accesses said cache.

13. The method of claim 12, wherein said program thread is executed by a first processor core and said prefetching thread is executed by a second processor core.

14. The method of claim 11, further comprising the steps of detecting address patterns in said original program thread wherein memory-accessing instructions that repeatedly occur in said thread each specify a memory address that bears an identifiable relationship with an address of a previously executed memory-accessing instruction and if such patterns are detected, then prefetching data from said memory based on said detected patterns and loading said data into said cache.

15. The method of claim 11, further comprising the steps of determining whether an instruction in said original program thread requires data from said memory whose access will stall said first processor; and if so, temporarily retiring said instruction but continuing to execute instructions following said retired instruction to facilitate precaching of upcoming data from said memory into said cache; and when said data for said retired instruction is finally retrieved from memory, restarting execution of said original program thread from said retired instruction.

16. A computer system comprising:
a first processor for executing a program thread;
at least one cache accessible by said processor to hold data to be employed during execution of said program thread;
a memory accessible by said processor;
wherein, said program thread includes a sequence of register-writing instructions at least including a plurality of memory-accessing instructions that each specify an address where data to be loaded into a register in said processor during execution of said memory-accessing instruction resides in said memory; and a value predictor for receiving from said first processor, said register-writing instructions and results thereof, determining a likely result for a future execution of each said instruction and forming a prefetching thread comprised of said results generated by said value predictor if said value is determined to have a confidence level exceeding a threshold, said value predictor including means for dynamically adjusting a number of iterations ahead that said value predictor predicts the result of each instruction in response to a currently detected cycle time between executions of consecutive iterations of an instruction;

whereby execution of said prefetching thread causes data to be employed during execution of said first program thread to be loaded into said cache.

17. The system of claim 16, further including a second processor for executing said prefetching thread, said second processor also accessing said cache.

18. The system of claim 17, wherein said first and second processors comprise first and second processor cores.

19. The system of claim 16, further comprising a stream prefetching module for detecting address patterns in said original program thread for memory-accessing instructions that specify addresses which are not resident in said cache, occur repeatedly in said thread and bear an identifiable relationship with an address of a previously executed memory-accessing instruction and if such patterns are detected, then prefetching data from said memory based on said detected patterns and loading said data into said cache.

20. The system of claim 16, wherein said first processor includes means for performing runahead execution wherein if an instruction in said original program thread requires data from memory whose access will stall said first processor; temporarily retiring said instruction but continuing to execute instructions following said retired instruction to facilitate precaching of upcoming data from said memory into said cache; and when said data for said retired instruction is finally retrieved from memory, restarting execution of said original program thread from said retired instruction.

* * * * *